United States Patent
Prigione et al.

(10) Patent No.: US 7,935,257 B2
(45) Date of Patent: May 3, 2011

(54) **USE OF *RHIZOMUCOR PUSILLUS* (LINDT) SCHIPPER IN METHODS FOR TREATING INDUSTRIAL WASTEWATERS CONTAINING DYES**

(75) Inventors: Valeria Paola Prigione, Asti (IT); Giovanna Cristina Varese, Turin (IT); Leonardo Casieri, Turin (IT); Samuele Voyron, Cesana Torinese (IT); Antonio Bertolotto, Vignolo (IT); Valeria Filipello Marchisio, Turin (IT)

(73) Assignees: Marcopolo Engineering SpA, Borgo San Dalmazzo (Cuneo) (IT); Universita Degli Studi di Torino, Turin (IT)

(*) Notice: Subject to any disclaimer, the term of this patent is extended or adjusted under 35 U.S.C. 154(b) by 735 days.

(21) Appl. No.: 11/979,843

(22) Filed: Nov. 8, 2007

(65) Prior Publication Data
US 2008/0110826 A1 May 15, 2008

(30) Foreign Application Priority Data
Nov. 13, 2006 (IT) .............................. TO2006A0810

(51) Int. Cl.
*C02F 3/00* (2006.01)
(52) U.S. Cl. ........................................ 210/611; 210/917
(58) Field of Classification Search .................. 210/611, 210/917
See application file for complete search history.

(56) References Cited

U.S. PATENT DOCUMENTS
2003/0167513 A1* 9/2003 Mourad et al. ................. 800/278
2007/0254346 A1* 11/2007 Yeboah et al. ................. 435/117

OTHER PUBLICATIONS
European Search Report dated Feb. 25, 2008.
Van Driessel, B., et al, "Decolorization of Bleach Plant Effluent by Mucoralean and White-Rot Fungi in a Rotating Biological Contractor Reactor," Journal of Bioscience and Bioengineering, vol. 92, No. 3, 2001, pp. 271-276, XP002467943.
Christov, L.P., et al, "Fungal Biomass from *Rhizomucor pusillus* as adsorbent of chromophores from a bleach plant effluent," Process Biochemistry, vol. 35, 1999, pp. 91-95, XP002467944.
Yuzhu, F., et al, "Fungal decolorization of dye wastewaters: a review," Bioresource Technology, 79 (2001) 251-262, XP-002467923.
Polman, J. K., et al, "Biomass-Mediated Binding and Recovery of Textile Dyes from Waste Effluents," Textile Chemist and Colorist, vol. 28, No. 4, Apr. 1996, pp. 31-35, XP-000589145.
U.S. Appl. No. 11/979,845.
U.S. Appl. No. 11/979,842.
U.S. Appl. No. 11/979,843.

* cited by examiner

*Primary Examiner* — Chester T Barry
(74) *Attorney, Agent, or Firm* — Nixon & Vanderhye P.C.

(57) ABSTRACT

Use of a fungal biomass for treating industrial wastewaters containing at least one dye and related method, wherein:
i. the fungal biomass contains at least the fungal species *Rhizomucor pusillus* (Lindt) Schipper;
ii. the fungal biomass absorbs the at least one dye, so as to obtain wastewater that is basically free of the at least one dye.

18 Claims, 1 Drawing Sheet

Figure 1.

USE OF *RHIZOMUCOR PUSILLUS* (LINDT) SCHIPPER IN METHODS FOR TREATING INDUSTRIAL WASTEWATERS CONTAINING DYES

TECHNICAL FIELD OF THE INVENTION

The present invention relates in general to methods for treating industrial wastewaters containing dyes. More particularly, the present invention relates to the use of fungal species in methods for treating industrial wastewaters containing dyes.

TECHNICAL BACKGROUND OF THE INVENTION

Large amounts of dyes are used in various industrial fields, such as food, drug, cosmetic, textile and tanning fields (Mc-Mullan et al., 2001). It is estimated that the annual world production of dyes is above 700,000 tons, more than a half of which include dyes for textile fibers, 15% are dyes for other substrates such as leather and paper, 25% are organic pigments and the remaining portion is made up of dyes for particular uses (McMullan et al., 2001, Pearce et al., 2003).

Depending on molecule charge, dyes can be classed into anionic (acid), cationic (basic) and non-ionic dyes. As an alternative, depending on the chromophore group they can be classed into azo, anthraquinone, indigo, stilbene dyes etc., or depending on their applications. Azo and anthraquinone dyes represent the most widespread classes of dyes for industrial applications (Soares et al., 2001). Azo dyes are characterized by the presence of a double bond N=N and by other groups that are hard to degrade (Martins et al., 2001) and represent more than 50% of total production. Their fixing capacity is generally low and so more than 40% of the amount used gets into industrial waste, which has a clear color resulting therefrom, even after accurate purification treatments (O'Neill et al., 1999). Anthraquinone dyes represent the second class for industrial relevance and can be divided into dyes derived from indigo and from anthraquinone. They are prepared by successive introduction of the substituents on the pre-formed skeleton of anthraquinone.

Every year 5% to 10% of the world production of textile dyes is discharged into industrial wastewaters, which get in their turn into natural waterways where they can cause great problems for the environment and for living organisms (Yesilada et al., 2003). As a matter of fact, conventional methods for treating wastewaters are not sufficient to completely remove most of the dyes, which therefore tend to accumulate in the environment due to their complex molecular structure, designed on purpose for giving high stability to light, water and oxidizing agents (Fu and Viraraghavan, 2002a).

Dyes are toxic substances as shown by ETAD (1989) in a test on animals for 4,000 dyes. They can also have a carcinogenic and mutagenic action, due to the formation of aromatic amines when they are degraded under anaerobiosis from bacteria, as was shown in several researches on fishes, mice and other animals (Weisburger et al., 2002). Genotoxic and carcinogenic effects are also possible on men, on whom dyes cause at least short-term phenomena of contact and inhaling irritation (Yesilada et al., 2003).

When dyes get into surface water, indirect damages to ecosystems are likewise serious. As a matter of fact, gas solubility is compromised and above all water transparency properties are altered, which results in serious consequences for flora and fauna (Fu and Viraraghavan, 2002a). Lower penetration of sun rays causes indeed a reduction of oxygen concentration, which can be in its turn fatal for most water organisms (Yesilada et al., 2003).

Toxic substances contained in waste of industries using dyes should therefore be completely removed before being released into the environment (Knapp et al., 2001). Physical and chemical purification methods are not always applicable and/or effective and always involve high costs for firms (Fu and Viraraghavan, 2001, Robinson et al., 2001).

Chemical treatments exploiting oxidizing processes are among the most used methods, above all thanks to their easy application. Some of them, however, involve the use of chemical compounds that are noxious for men's health and/or for the environment such as the use of bleaching agents (Knapp et al., 2001). Among the most widespread treatments the following should be mentioned: treatment with $H_2O_2$ together with iron salts, with sodium hypochlorite, with ozone, photochemical and photocatalytic methods, electro-chemical destruction (Robinson et al., 2001).

Physical methods based on the absorption of dyes into various abiotic matrices have proved to be effective in many cases. Decolourization by absorption is mainly based on ion exchange, which is affected by several factors such as the interaction between the dye and the type of substances used for absorption, temperature, pH, contact time, etc. Active carbons, peat, wood chips, filtration membranes are the most used absorbing agents. Absorption is often favored by the use of ultrasounds (Robinson et al., 2001, Crini, 2006).

A valid alternative to most traditional treatments of dyed wastewaters, characterized by low cost and low environmental impact, is the use of biologic systems, i.e. biomasses that are able to degrade toxic substances up to the mineralization thereof (biodegradation), or absorb them more or less passively on their cell structures (biosorption) (Banat et al., 1996).

Recently, several researches have shown that biosorption can be regarded as a valid alternative to chemical-physical methods and to microbial and/or enzymatic biodegradation. Such researches have pointed out the capacity of various microbial biomasses (bacteria, yeasts, fungi and algae) to absorb or accumulate dyes (Polman et al., 1996, Crini, 2006), and among the various types of biomass the fungal biomass has proved to be particularly suitable, even if the mechanisms regulating absorption have not yet been fully explained (Knapp et al., 2001, Crini, 2006).

In studies on biosorption with fungal biomasses, Mitosporic fungi and Zygomycetes, belonging to the genus *Aspergillus, Penicillium, Myrothecium* and *Rhizopus*, are mainly used. Only in some cases Basidiomycetes are used, since for these fungi the main decolourization mechanism is degradation and, according to Knapp et al. (2001), absorption occurs only in the initial stage of fungus-dyes interaction, which allows to create a strong contact between chromophores and degrading enzymes associated to the surface of hyphae.

Mechanisms regulating dye biosorption by the biomass seem to vary both as a function of the chemical structure of the dye and as a function of the specific chemical and structural composition of the biomass used. As a matter of fact, it was shown that some dyes have a particular affinity for particular species of organisms (Robinson et al., 2001).

Fu and Viraraghavan (2002b), working with biomasses of *Aspergillus niger* that had been deactivated, dried, pulverized and subjected to various chemical treatments, so as to selectively deactivate different chemical groups, have shown that dye biosorption preferably occurs on cell wall, where the main binding sites would be made up of amine and carboxyl groups. It should still be explained whether during biosorption processes the dye is bound only to the outer surface or whether it can also be carried, at least partially, into the hyphae (Polman and Breckenbridge, 1996; Brahimihorn et al., 1992).

With respect to traditional chemical-physical methods, biosorption has indubitable advantages such as a highly rapid treatment and the possibility of recovering absorbed dye for future use. Moreover, it can be carried out also with deactivated biomasses; this has huge advantages both thanks to the lower environmental impact and because it is not necessary to monitor the various factors affecting the growth of a living organism.

However, there are several factors that might affect biosorption yields, in particular growth substrate, pH, incubation temperature and initial dye concentration (Aksu and Tezer, 2000; Abd El Rahim et al., 2003, Aksu Z., 2005).

DESCRIPTION OF THE INVENTION

The invention aims at identifying/selecting fungal species to be used in methods for treating industrial wastewaters containing dyes.

According to the present invention, such aim is achieved thanks to the solution specifically disclosed in the following claims. The claims are an integral and substantial part of the technical teaching provided here with reference to the invention.

In particular, the invention relates to the use of the fungal species *Rhizomucor pusillus* (Lindt) Schipper in a method for the biosorption of industrial dyes, e.g. of the dyeing or tanning industry.

DETAILED DESCRIPTION OF THE INVENTION

The invention will now be described in detail with reference to some preferred embodiments, provided by way of mere non-limiting example.

In a particular and preferred embodiment of the present invention, the fungal biomass used includes the fungal species *Rhizomucor pusillus* (Lindt) Schipper. More specifically, the present invention relates to the use of the fungal strain *Rhizomucor pusillus* (Lindt) Schipper MUT 2229 deposited at the DSMZ (Deutsche Sammlung von Mikroorganismen und Zellkulturen GmbH) Braunschweig, Germany, under access number DSMZ 18656 on Sep. 15, 2006.

The results obtained by the present inventors show that biomasses, both living and deactivated, of *R. pusillus* MUT 2229 have high biosorption yields, both towards single dyes belonging to the main classes of industrial dyes (azo and anthraquinone dyes), towards a simulated wastewater containing ten dyes differing in chromophore group (azo, anthraquinone or phthalocyanine group) and in chemical group (acid, reactive or direct group), and towards three effluent models designed to mime wastes produced during cotton or wool textile dyeing processes. The added value of the last result stems from the fact that model effluents were prepared using mixed commercially important industrial dyes, contain high concentration of salts and mimic the industrial wastewaters also for the pH values introducing real parameters that often bars the attainment of good biosorption yields according to Aksu (2005). Most works on biosorption published until today relate to the treatment of simulated wastewaters containing single dyes or maximum 2-3 dyes simultaneously, with total concentrations of about 200 ppm and almost never above 800 ppm (Aksu and Tezer, 2000). The concentrations of wastewaters used in the present study (up to 5,000 ppm) can therefore be regarded as very high and representative of actual industrial wastewaters.

The comparison with data available from scientific literature shows that the values of sorption capacity for *R. pusillus* MUT 2229 obtained towards industrial dyes are comparable both with values disclosed in the scientific literature for other living or deactivated fungal biomasses (Fu and Viraraghavan, 2000; 2002a; O'Mahoney et al., 2002; Zhang et al., 2003; Aksu, 2005), and with theoretical values for fungus *Rhizopus oryzae* towards different industrial dyes (Aksu and Tezer, 2000; Aksu and Cagatay, 2006). Table 1 contains sorption capacities of living or deactivated biomasses of different fungal species disclosed in the scientific literature and of fungal species according to the present invention.

TABLE 1

| Fungal species | Biomass | Dyes used | Sorption capacity (mg g$^{-1}$) | Authors |
|---|---|---|---|---|
| *Aspergillus niger* | Deactivated | Basic Blue 9 (50 ppm) | Up to 18.5 | Fu and Viraraghavan, 2000 |
| *Aspergillus niger* | Deactivated | Acid Blue 29 (50 ppm) | 1.4-13.8 | Fu and Viraraghavan, 2002a |
| *Aspergillus niger* | Deactivated | Congo Red (50 ppm) Basic Blue 9 (50 ppm) Acid Blue 29 (50 ppm) Disperse Red 1 (50 ppm) | Up to 17.6 | Fu and Viraraghavan, 2002b |
| *Penicillium oxalicum* | Living | Reactive Red 241 (100 ppm) Reactive Blue 19 (100 ppm) Reactive Yellow 145 (100 ppm) | 115-160 | Zhang et al., 2003 |
| *Rhizopus oryzae* | Deactivated | Reactive Orange 16 (250 ppm) Reactive Red 4 (250 ppm) Reactive Blue 19 (250 ppm) MIX (450 ppm) | 90-190 | O'Mahoney et al., 2002 |

TABLE 1-continued

| Fungal species | Biomass | Dyes used | Sorption capacity (mg g$^{-1}$) | Authors |
|---|---|---|---|---|
| *Rhizopus arrhizus* = *R. oryzae* | Deactivated | Reactive Black 5 (800 ppm)<br>Remazol turquoise Blue-G (800 ppm) | Up to 500.7<br>Up to 773 | Aksu and Tezer, 2000<br>Aksu and Cagatay, 2006 |
| *Rhizomucor pusillus* | Living | R80 (1,000 ppm)<br>B214 (1,000 ppm) | Up to 179.1<br>Up to 145 | * |
| *Rhizomucor pusillus* | Deactivated | Direct Red 80 (5,000 ppm)<br>Reactive Blue 214 (5,000 ppm)<br>Mix of 10 dyes (5,000 ppm) | Up to 386.8<br>Up to 532.8<br>Up to 785.1 | * |

Also more recent scientific literature does not disclose studies in which the biomass, either living or deactivated, of *Rhizomucor pusillus* has been used for removing textile dyes from industrial wastewaters. This species has been used as living biomass for removing chromogenic compounds (above all lignosulfonate residues) from wastewaters of the bleaching process in paper industry, alone (Christov et al., 1999) or together with *Trametes versicolor*, by way of a combined absorption-degradation process (Van Driessel and Christov, 2001). Van Driessel and Christov (2001) further showed that chromogen absorption was mainly due to the chitin/chitosane fraction of cell wall.

The fast removal of dyes both from simulated wastewaters, and from effluent models as shown in the tests carried out by the present inventors, and above all the excellent decolourization percentages already obtained after 2 hours of treatment, point out the industrial applicability of the biomasses of *Rhizomucor pusillus* MUT 2229.

The higher sorption capacities observed with deactivated biomasses, together with the absence of modification of the absorption spectrum during the decolourization treatment, support the hypothesis according to which biosorption is a process involving only passive chemical and/or physical mechanisms, independently from fungus metabolism. The use of deactivated biomasses is preferable with respect to the use of living organisms both for environmental and for safety reasons. Moreover, deactivated biomasses have important application advantages: they do not require a continuous introduction of nutrients, they are not affected by high levels of toxic compounds that are often present in wastewaters to be treated, and in some cases they can be regenerated and/or used for following treatment cycles (Aksu, 2005).

Figure 1:
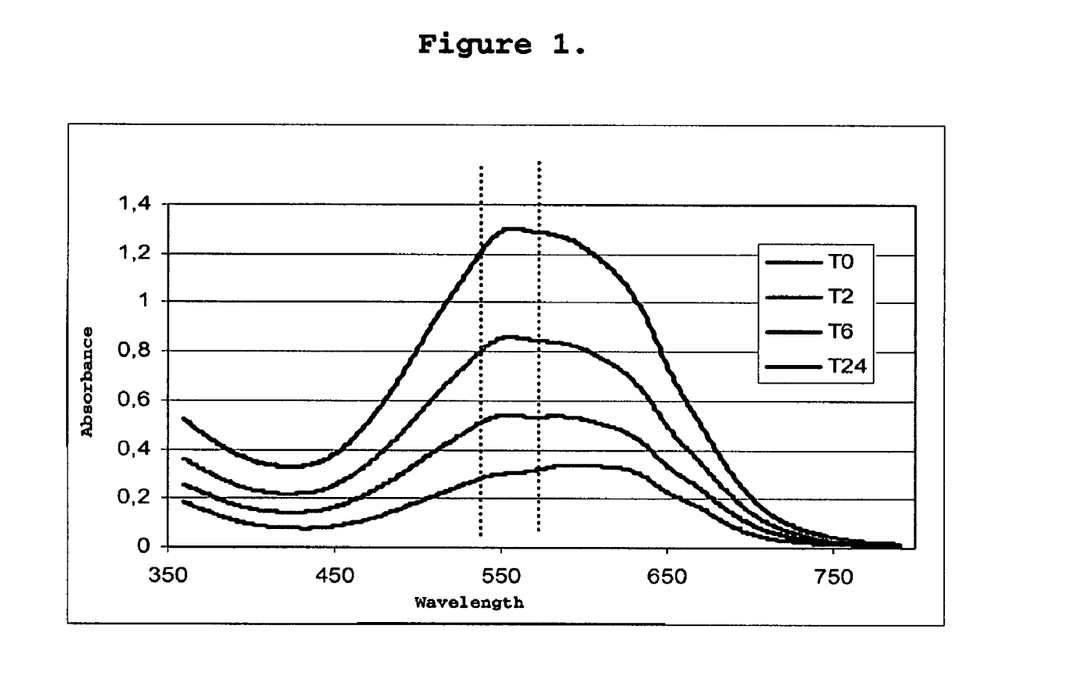
FIG. 1. Absorbance spectrum of the simulated effluent containing the mix of 10 dyes at test beginning and after 2, 6 and 24 hours of incubation with the deactivated biomass of *Rhizomucor pusillus* MUT 2229 pre-grown in the culture medium GN1. Hatched lines refer to the wavelengths at which the modification of the absorption spectrum is more evident.

The results obtained by the present inventors suggest that the chemical structure of dyes can affect sorption yields. Differences in steric size and/or charge distribution can be the factors affecting the interaction between the binding sites on fungus wall and dye molecules. Such hypothesis is confirmed by the modification of the profile of the absorption spectrum for the wastewater containing the mix of dyes, which has been detected during the test. Such spectrum modification can be explained assuming that some dyes can be absorbed more or less easily by the biomass (FIG. 1).

In the tests discussed in the present application, biomasses pre-grown on different culture media have significantly different sorption capacities with respect to the same dye.

It is known that the culture medium can modify both the chemical structure and the structure of cell wall (Bartniki-Garcia and Nickerson, 1962; Farkas, 1980; Krystofova et al., 1998; El-Mougith et al., 1999; Hefnavy et al., 1999; Znidarsic et al, 1999; Nemcovic and Farkas, 2001) as well as colony morphology (Pessoni et al., 2005). According to Znidarsic et al. (1999) the amount and quality of carbon and nitrogen sources can affect the amount of structural compounds, such as chitin and chitosane, and of other chemical groups that are present in cell wall.

Highly interesting is the fact that the biomass of *R. pusillus* MUT 2229 pre-grown in AM, the culture medium containing starch as carbon source, has shown good sorption capacities towards all the simulated wastewaters and effluent models tested. This result is very important from the point of view of application, if the method has to be used on an industrial level; as a matter of fact, starch is a by-product of several industrial processes and represents therefore a low-cost carbon source and the use thereof would thus enable to reduce biomass costs, which are generally quite high.

Description of *Rhizomucor pusillus* (Lindt)

Description of fungus *Rhizomucor pusillus* (Lindt) grown on Malt Extract Agar at 30° C. Colonies having first a white color, then turning with maturity to neutral gray or sepia, woolly, 2-3 mm of height. Heterothallic species; brownish red or black zygospores, diameter of 45-63(70) microns, irregularly verrucose. Rhizoids present at the base of sporangiophores. Colorless or brownish yellow sporangiophores, diameter of 10 microns, with simpodial ramifications and end-side umbelliform ramifications. Sporangia with diameter of 50-80 microns, with spinulous wall breaking at maturity stage. Subglobous or slightly oblong columella, diameter of 15-35 microns, up to 60 microns of height. Globous or subglobous sporangiospores, hyaline, with smooth wall, diameter of 3-5 microns. Clamidospores absent. Optimal growth temperature 50° C.

Materials and Methods

The isolate of *Rhizomucor pusillus* (Lindt) Schipper MUT 2229 (deposited at DSMZ under access number 18656) kept at Mycotheca Universitatis Taurinensis (MUT, Università di Torino, Dipartimento di Biologia Vegetale) as colony in active growth, on Agar Malt medium at a temperature of 4° C.

Tested Dyes and Preparation of Simulated Wastewaters and Effluent Models

Simulated Wastewaters

Bioabsorption tests have been carried out using 9 industrial textile dyes (Clariant Italia S.p.a.) and the model dye RBBR (Remazol Brilliant Blue, Sigma-Aldrich, St. Luis, Mo.). The chemical-physical properties and, if available, the structural formula of the 10 dyes are listed in Table 2.

For each dye a stock solution at a concentration of 20,000 ppm has been prepared by dissolving the dye powder in distilled water. Such solutions have been sterilized by filtration (disposable cellulose acetate filters with pores having a diameter of 0.2 μm—Schleicher & Schuell GmbH, Dassel, Germany) and stored at 4° C. up to the preparation of the simulated wastewaters.

Since in industrial dyeing processes reactive dyes are released into wastewaters in hydrolyzed form, the stock solutions of dyes B41, B49, B214, R243 and RBBR have been hydrolyzed by means of a 2-hour treatment at 80° C. with a solution of 0.1 M $Na_2CO_3$, and then neutralized with a solution of 1N HCl.

For bioabsorption tests with living biomasses the following simulated wastewaters have been used:
- saline solution (9 g $l^{-1}$ NaCl) containing the industrial direct azo dye R80 at concentrations of 200 and 1,000 ppm;
- saline solution (9 g $l^{-1}$ NaCl) containing the industrial reactive azo dye B214 at concentrations of 200 and 1,000 ppm.

For bioabsorption tests with deactivated biomasses the following simulated wastewaters have been used:
- saline solution (9 g $l^{-1}$ NaCl) containing the industrial direct azo dye R80 at concentrations of 1,000 and 5,000 ppm;
- saline solution (9 g $l^{-1}$ NaCl) containing the industrial reactive azo dye B214 at concentrations of 1,000 and 5,000 ppm.
- saline solution (9 g $l^{-1}$ NaCl) containing the anthraquinone type dye RBBR at concentrations of 1,000 and 5,000 ppm;
- saline solution (9 g $l^{-1}$ NaCl) containing all ten dyes at a final concentration of 5.000 ppm (mix).

Effluent Models

Three effluent models designed to mime wastes produced during cotton or wool dyeing processes were prepared using mixed industrial dyes at high concentrations. The effluent models were developed by partners of the EC FP6 Project SOPHIED (NMP2-CT-2004-505899) and used under the permission of the SOPHIED Consortium.

The industrial dyes used in these wastewater models were selected because of representative of the most structural dye types, commercially important and with a wide range of applications across the textile industries and were purchased from Town End (Leeds) plc. The chemical-physical properties and the structural formula of the 10 dyes are listed in Table 3. In addition to the dyes, these effluent models mimic the industrial ones also for the presence of different salts, often in high concentrations, and for the pH values.

The first wastewater (R1) contained a mix of 3 acid dyes (300 ppm in total), and has an ionic strength of $4.23 \cdot 10^{-2}$ and pH 5. The second wastewater (R2) contained a mix of 4 reactive dyes previously hydrolyzed (5000 ppm total), and has an ionic strength of $1.26 \cdot 10^{-1}$ and pH 10. The third wastewater (R3) contained a mix of 3 direct dyes (3000 ppm total) and has an ionic strength of 1.48 and pH 9. The exact composition of the 3 effluent models is listed in table 4. All the mimed effluents were sterilized by tindalization (three 1 hour cycles at 60° C. with 24 hr interval between cycles at room temperature).

Preparation of Fungal Cultures and Production of Biomass

The reproductive propagules have been taken from colonies in active growth aged 7 days, and suspensions have been prepared at the known concentration of $2.5 \cdot 10^5$ conidia $ml^{-1}$ in sterile deionized water using a hemocytometer (Bürker's chamber). One ml of such suspension has been inoculated into 500 ml flasks containing 250 ml of culture medium. The following culture media have been used for producing the biomasses:

Culture Medium GN1
glucose 20 g $l^{-1}$
ammonium tartrate 1 g $l^{-1}$
$KH_2PO_4$ 2 g $l^{-1}$
$MgSO_4 \cdot 7H_2O$ 0.5 g $l^{-1}$
$CaCl_2 \cdot 2H_2O$ 0.1 g $l^{-1}$
10 ml of a mineral solution containing: 5 mg $l^{-1}$ $MnSO_4 \cdot 5H_2O$, 10 mg $l^{-1}$ NaCl, 1 mg $l^{-1}$ $FeSO_4 \cdot 7H_2O$, 1 mg $l^{-1}$ $CoCl_2 \cdot 6H_2O$, 1 mg $l^{-1}$ $ZnSO_4 \cdot 7H_2O$, 0.1 mg $l^{-1}$ $CuSO_4 \cdot 5H_2O$, 0.1 mg $l^{-1}$ $AlK(SO_4)_2$, 0.1 mg $l^{-1}$ $H_3BO_3$, 0.1 mg $l^{-1}$ $NaMoO_4 \cdot 2H_2O$.

Culture Medium GN4
glucose 20 g $l^{-1}$
ammonium tartrate 4 g $l^{-1}$
$KH_2PO_4$ 2 g $l^{-1}$
$MgSO_4 \cdot 7H_2O$ 0.5 g $l^{-1}$
$CaCl_2 \cdot 2H_2O$ 0.1 g $l^{-1}$
10 ml of a mineral solution containing: 5 mg $l^{-1}$ $MnSO_4 \cdot 5H_2O$, 10 mg $l^{-1}$ NaCl, 1 mg $l^{-1}$ $FeSO_4 \cdot 7H_2O$, 1 mg $l^{-1}$ $CoCl_2 \cdot 6H_2O$, 1 mg $l^{-1}$ $ZnSO_4 \cdot 7H_2O$, 0.1 mg $l^{-1}$ $CuSO_4 \cdot 5H_2O$, 0.1 mg $l^{-1}$ $AlK(SO_4)_2$, 0.1 mg $l^{-1}$ $H_3BO_3$, 0.1 mg $l^{-1}$ $NaMoO_4 \cdot 2H_2O$.

Culture Medium EQ
glucose 20 g $l^{-1}$
ammonium tartrate 2 g $l^{-1}$
$KH_2PO_4$ 2 g $l^{-1}$
$MgSO_4 \cdot 7H_2O$ 0.5 g $l^{-1}$
$CaCl_2 \cdot 2H_2O$ 0.1 g $l^{-1}$
10 ml of a mineral solution containing: 5 mg $l^{-1}$ $MnSO_4 \cdot 5H_2O$, 10 mg $l^{-1}$ NaCl, 1 mg $l^{-1}$ $FeSO_4 \cdot 7H_2O$, 1 mg $l^{-1}$ $CoCl_2 \cdot 6H_2O$, 1 mg $l^{-1}$ $ZnSO_4 \cdot 7H_2O$, 0.1 mg $l^{-1}$ $CuSO_4 \cdot 5H_2O$, 0.1 mg $l^{-1}$ $AlK(SO_4)_2$, 0.1 mg $l^{-1}$ $H_3BO_3$, 0.1 mg $l^{-1}$ $NaMoO_4 \cdot 2H_2O$.

Culture Medium AM
potato starch 18 g $l^{-1}$
ammonium tartrate 2 g $l^{-1}$
$KH_2PO_4$ 2 g $l^{-1}$
$MgSO_4 \cdot 7H_2O$ 0.5 g $l^{-1}$
$CaCl_2 \cdot 2H_2O$ 0.1 g $l^{-1}$
10 ml of a mineral solution containing: 5 mg $l^{-1}$ $MnSO_4 \cdot 5H_2O$, 10 mg $l^{-1}$ NaCl, 1 mg $l^{-1}$ $FeSO_4 \cdot 7H_2O$, 1 mg $l^{-1}$ $CoCl_2 \cdot 6H_2O$, 1 mg $l^{-1}$ $ZnSO_4 \cdot 7H_2O$, 0.1 mg $l^{-1}$ $CuSO_4 \cdot 5H_2O$, 0.1 mg $l^{-1}$ $AlK(SO_4)_2$, 0.1 mg $l^{-1}$ $H_3BO_3$, 0.1 mg $l^{-1}$ $NaMoO_4 \cdot 2H_2O$.

The use of starch, glucose, sucrose or mixtures thereof is necessary as carbon source for growing the fungal culture. Such components can be used both as pure substances and as by-products of industrial productions. For instance, instead of starch potato peels can be used; instead of glucose molasses, bagasse, black liquors deriving from spirits or sugar cane industry can be used.

Incubation has been carried out under stirring at 110 rpm and at a temperature of 30° C. (thermostatic planetary stirrer Minitron Infors, Bottmingen, CH). After 7-8 days of incubation the biomasses have been taken from the culture medium by filtration, using a metal sieve with pores having a diameter of 150 μm, and have been rinsed several times with saline solution (9 g $l^{-1}$ NaCl) so as to remove residues of culture medium that might have interfered with following test stages. The biomasses have been divided into two parts: one part has been kept alive, the other one has been deactivated, and both parts have been used in the following biosorption tests.

Deactivation of Biomass

The biomasses have been placed in saline solution (9 g $l^{-1}$ NaCl) and deactivated by sterilization in autoclave at a temperature of 120° C. for 30 minutes. After such treatment the biomasses have been rinsed several times with saline solution.

TABLE 2

| Common name | Trade name | C.I. name | Chromophore group | Chemical group | $\lambda_{max}$ (nm) | Chemical structure |
|---|---|---|---|---|---|---|
| B113* | Nylosan navy blue N-RBL P 187 | acid blue 113 | azo | acid | 541 → | |
| B214 | Drimaren navy blue X-GN CDG | reactive blue 214 | azo | reactive | 607 | |
| B225 | Nylosan blue F-2RFL P 160 | acid blue 225 | anthraquinone | acid | 590-626 | |
| B41 | Drimaren turquoise X-B CDG | reactive blue 41 | phthalocyanine | reactive | 616-666 | |
| B49* | Drimaren blue P-3RLN GR | reactive blue 49 | anthraquinone | reactive | 586-625 → | |

TABLE 2-continued

| Common name | Trade name | C.I. name | Chromophore group | Chemical group | $\lambda_{max}$ (nm) | Chemical structure |
|---|---|---|---|---|---|---|
| B81* | Solar blue G P 280 | direct blue 81 | azo | direct | 577 → | |
| R111* | Nylosan scarlet F-3GL 130 | acid red 111 | azo | acid | 499 → | |
| R243 | Drimaren red X-6BN CDG | reactive red 243 | azo | reactive | 517 | |

TABLE 2-continued

| Common name | Trade name | C.I. name | Chromophore group | Chemical group | $\lambda_{max}$ (nm) | Chemical structure |
|---|---|---|---|---|---|---|
| R80* | Solar red BA P 150 | direct red 80 | azo | direct | 540 → |  |
| RBBR* | Remazol brilliant blue R | reactive blue 19 | anthraquinone | reactive | 593 → |  |

*Dyes whose chemical structure is shown in the right column.

TABLE 3

| Acronymus | C.I. name | Chromophore | Chemical class | Chemical structure |
|---|---|---|---|---|
| ABk194 | Acid black 194 | Azoic (1:2 Cr complex) | Acid |  |
| ABk210 | Acid black 210 | Trisazoic | Acid |  |

TABLE 3-continued

| Acronymus | C.I. name | Chromophore | Chemical class | Chemical structure |
|---|---|---|---|---|
| AY194 | Acid yellow 194 | Azoic (1:2 Co complex) | Acid | (structure shown) |
| ABu62 | Acid blue 62 | Anthraquinonic | Acid | (structure shown) |

TABLE 3-continued

| Acronymus | C.I. name | Chromophore | Chemical class | Chemical structure |
|---|---|---|---|---|
| AR266 | Acid red 266 | Azoic | Acid | |
| AY49 | Acid Yellow 49 | Monoazoic | Acid | |
| DrBu71 | Direct blue 71 | Trisazoic | Direct | |

TABLE 3-continued

| Acronymus | C.I. name | Chromophore | Chemical class | Chemical structure |
|---|---|---|---|---|
| DrR80 | Direct red 80 | Polyazoic | Direct | |
| DrY106 | Direct Yellow 106 | Stilbenic | Direct | |

TABLE 3-continued

| Acronymus | C.I. name | Chromophore | Chemical class | Chemical structure |
|---|---|---|---|---|
| RBk5 | Reactive black 5 | Disazoic | Reactive |  |
| Rbu222 | Reactive blue 222 | Disazoic | Reactive |  |

TABLE 3-continued

| Acronymus | C.I. name | Chromophore | Chemical class | Chemical structure |
|---|---|---|---|---|
| RR195 | Reactive red 195 | Monoazoic | Reactive | |
| RY145 | Reactive Yellow 145 | Monoazoic | Reactive | |

TABLE 4

| Effluent model | Dyes and salts | Concentration g l$^{-1}$ | pH |
|---|---|---|---|
| Acid bath for wool (R1) | Abu 62 | 0.10 | 5 |
| | AY 49 | 0.10 | |
| | AR 266 | 0.10 | |
| | Na$_2$SO$_4$ | 2.00 | |
| Reactive dye bath for cotton (R2) | Rbu 222 | 1.25 | 10 |
| | RR195 | 1.25 | |
| | RY145 | 1.25 | |
| | Rbk 5 | 1.25 | |
| | Na$_2$SO$_4$ | 70.00 | |
| Direct dye bath for cotton (R3) | DrBu 71 | 1.00 | 9 |
| | DrR 80 | 1.00 | |
| | DrY 106 | 1.00 | |
| | NaCl | 5.00 | |

Biosorption Tests

Living and deactivated biomasses have been divided into 3 g aliquots (living weight) and incubated in 50 ml flasks containing 30 ml of simulated wastewater. 3 repetitions have been prepared for each test.

Incubation has been carried out under stirring at 110 rpm and at a temperature of 30° C. (thermostatic planetary stirrer Minitron Infors, Bottmingen, CH). After 2, 6 and 24 hours of incubation 300 µl of simulated wastewater have been taken for each sample and centrifuged at 14,000 rpm for five minutes, so as to remove biomass fragments that might have interfered with following spectrophotometric measures.

By means of a spectrophotometer Amersham Biosciences (Fairfield, Conn.), the wastewater absorption spectrum in the visible has been acquired for each sample ($\lambda$=360 nm to $\lambda$=790 nm).

In the case of simulated wastewaters, the decolourization percentage (DP), expressed as percentage of removed dye, has been calculated according to the following formula:

$$DP = 100 \cdot [(Abs_0 - Abs_t)/Abs_0]$$

wherein $Abs_0$ is absorbance at time 0 and $Abs_t$ is absorbance at time t, at the maximum wavelength in the visible ($\lambda_{max}$) for each dye (Table 2). Mix absorbance has been measured at a wavelength of 588 nm, corresponding to the maximum absorption in the visible.

In the case of effluent models, the DP values were calculated as the extent of decrease of the spectrum area from 360 nm to 790 nm, respect to that of the abiotic control.

Samples of simulated wastewaters without biomass have been used as abiotic controls and for detecting the presence, if any, of bleaching phenomena not related to biosorption, such as photodegradation and complexing.

At the end of the test the biomasses have been filtered on filter paper (Whatman type 1), placed in an oven and dried at a temperature of 65° C. for 24 hours, then weighed so as to obtain the dry weight for each biomass. It has thus been possible to calculate sorption capacity (SC) according to the following formula:

SC=mg of removed dye/g of biomass (dry weight)

When complete decolourization is achieved, SC is underrated, since removed dye is only part of what the biomass might have removed.

The significance of the differences ($p \leq 0.05$) between DP and SC values has been calculated by means of Mann-Whitney's non-parametric test (SYSTAT 10 for Windows, SPSS Inc., 2000).

Results
Biosorption Tests with Living Biomass

Decolourization percentages (averages and standard deviations of 3 repetitions) of simulated wastewaters containing dyes R80, B214 at a concentration of 200 ppm, after 2, 6 and 24 hours of incubation with living biomasses of *Rhizomucor pusillus* MUT 2229 pre-grown in EQ, GN1 and GN4, are shown in Table 5.

TABLE 5

| | | Decolourization percentage (%) | | |
|---|---|---|---|---|
| Dye | Culture medium | 2 hours | 6 hours | 24 hours |
| R80 | EQ | 99.8 ± 0.1 | 99.8 ± 0.1 | 99.9 ± 0.0 |
| | GN1 | 99.7 ± 0.1 | 99.8 ± 0.0 | 99.9 ± 0.0 |
| | GN4 | 99.5 ± 0.2 | 99.8 ± 0.1 | 99.8 ± 0.1 |
| B214 | EQ | 99.6 ± 0.4 | 98.8 ± 1.5 | 99.6 ± 0.2 |
| | GN1 | 97.7 ± 3.1 | 94.2 ± 1.2 | 99.4 ± 0.3 |
| | GN4 | 99.9 ± 0.1 | 100.0 ± 0.0 | 99.6 ± 0.2 |

Table 6 shows decolourization percentages of simulated wastewaters containing dyes R80, B214 at a concentration of 1,000 ppm, after 2, 6 and 24 ore of incubation with living biomasses of *Rhizomucor pusillus* MUT 2229 pre-grown in EQ, GN1 e GN4. The values contained therein represent averages±standard deviations of three repetitions.

TABLE 6

| | | Decolourization percentage (%) | | |
|---|---|---|---|---|
| Dye | Culture medium | 2 hours | 6 hours | 24 hours |
| R80 | EQ | 55.7 ± 1.6 | 66.8 ± 1.9 | 92.0 ± 1.1 |
| | GN1 | 48.9 ± 1.7 | 60.4 ± 1.3 | 83.9 ± 2.3 |
| | GN4 | 52.2 ± 4.5 | 65.4 ± 5.7 | 88.6 ± 6.9 |
| B214 | EQ | 98.6 ± 0.1 | 98.2 ± 0.9 | 99.1 ± 0.2 |
| | GN1 | 96.8 ± 0.7 | 97.0 ± 0.3 | 97.8 ± 0.6 |
| | GN4 | 96.9 ± 0.5 | 97.2 ± 0.6 | 97.8 ± 0.4 |

With simulated wastewaters at a concentration of 200 ppm an almost total decolourization has been obtained after 24 hours of treatment; both dyes have been removed with percentages that are always above 97.7% already in the first two hours of treatment (Table 5).

At a concentration of 1,000 ppm, the dye B214 has been removed more effectively than R80 with decolourization percentages, after 24 hours, that are always above 97.8%. Moreover, already after 2 hours of treatment the decolourization percentages observed were in all cases above 96.8%. The dye R80 has been the most difficult to remove from the simulated wastewater, although it reached after 24 hours of treatment decolourization percentages that are always above 83.9% (Table 6).

The monitoring of absorption spectra of simulated wastewaters before and after treatment shows that decolourization occurs only by means of biosorption (no biodegradation takes place), since the spectrum profile does not change although dye concentration sinks.

Table 7 shows sorption capacities of biomasses of *Rhizomucor pusillus* MUT 2229 pre-grown in EQ, GN1 and GN4 towards simulated wastewaters containing dyes R80 and B214 at a concentration of 1,000 ppm. The values contained therein represent the averages of three repetitions±standard deviations; different letters indicate significant differences ($p \leq 0.05$) among SCs of biomasses pre-grown on the different media with the same simulated wastewater.

TABLE 7

| | Sorption capacity mg of dye g$^{-1}$ of biomass | | |
|---|---|---|---|
| Dye | EQ | GN1 | GN4 |
| R80 | 142.0 ± 2.6$^A$ | 179.1 ± 2.6$^B$ | 147.9 ± 3.6$^A$ |
| B214 | 82.1 ± 2.2$^A$ | 145.0 ± 7.9$^B$ | 112.6 ± 7.4$^C$ |

Different letters refer to significant differences (p ≤ 0.05) among SCs of biomasses pre-grown in different culture media for the same simulated wastewater.

With both simulated wastewaters the living biomasses of *R. pusillus* MUT 2229 pre-grown in culture medium GN1 have proved to be the most suitable for removing dyes, achieving SC values of 179.1 mg g$^{-1}$ and 145 mg g$^{-1}$ for R80 and B214, respectively.

Biosorption Tests with Deactivated Biomass
Simulated Wastewaters

Decolourization percentages (averages and standard deviations of 3 repetitions) of simulated wastewaters containing dyes R80, B214 and RBBR at a concentration of 1,000 ppm, after 2, 6 and 24 hours of treatment with deactivated biomasses of *R. pusillus* MUT 2229 pre-grown in EQ, GN1 and GN4, are shown in Table 8.

TABLE 8

| | | Decolourization percentage (%) | | |
|---|---|---|---|---|
| Dye | Culture medium | 2 hours | 6 hours | 24 hours |
| R80 | EQ | 99.5 ± 0.2 | 99.9 ± 0.0 | 100.0 ± 0.0 |
| | GN1 | 98.1 ± 1.6 | 99.8 ± 0.1 | 99.9 ± 0.1 |
| | GN4 | 98.8 ± 0.1 | 99.0 ± 0.1 | 99.1 ± 0.3 |
| | AM | 73.6 ± 1.9 | 98.2 ± 0.4 | 99.9 ± 0.0 |
| B214 | EQ | 98.4 ± 0.1 | 98.6 ± 0.1 | 100.0 ± 0.0 |
| | GN1 | 98.8 ± 0.1 | 90.0 ± 0.1 | 99.1 ± 0.3 |
| | GN4 | 98.5 ± 0.1 | 98.9 ± 0.1 | 99.1 ± 0.1 |
| | AM | 91.7 ± 1.4 | 95.5 ± 0.4 | 98.8 ± 0.3 |
| RBBR | EQ | 60.2 ± 8.6 | 84.6 ± 6.2 | 97.9 ± 1.4 |
| | AM | 48.6 ± 14.5 | 67.1 ± 12.8 | 84.2 ± 4.6 |

Table 9 shows decolourization percentages of simulated wastewaters containing dyes R80, B214, RBBR and mix at a concentration of 5,000 ppm, after 2, 6 and 24 hours of incubation with deactivated biomasses of *Rhizomucor pusillus* MUT 2229 pre-grown in EQ, GN1 and GN4. The values contained therein represent averages±standard deviations of three repetitions.

TABLE 9

| | | Decolourization percentage (%) | | |
|---|---|---|---|---|
| Dye | Culture medium | 2 hours | 6 hours | 24 hours |
| R80 | EQ | 20.6 ± 3.9 | 35.0 ± 4.6 | 69.8 ± 2.6 |
| | GN1 | 23.7 ± 2.3 | 29.8 ± 3.4 | 37.6 ± 0.9 |
| | GN4 | 17.2 ± 1.0 | 25.1 ± 0.2 | 38.2 ± 0.2 |
| | AM | 35.1 ± 1.9 | 45.3 ± 5.1 | 76.3 ± 6.3 |
| B214 | EQ | 34.3 ± 6.3 | 44.0 ± 5.0 | 55.1 ± 3.6 |
| | GN1 | 25.9 ± 9.2 | 44.7 ± 6.8 | 50.8 ± 3.1 |
| | GN4 | 28.7 ± 1.4 | 49.6 ± 3.2 | 62.5 ± 1.8 |
| | AM | 62.0 ± 1.1 | 63.4 ± 2.4 | 81.0 ± 7.4 |
| RBBR | EQ | 35.7 ± 4.8 | 47.2 ± 10.4 | 47.5 ± 8.7 |
| | AM | 47.5 ± 4.6 | 49.6 ± 4.9 | 61.6 ± 2.9 |
| Mix | EQ | 58.5 ± 15.7 | 75.9 ± 11.1 | 88.7 ± 2.6 |
| | GN1 | 40.7 ± 3.2 | 62.8 ± 2.0 | 78.4 ± 0.4 |
| | GN4 | 45.4 ± 3.7 | 66.4 ± 3.3 | 79.9 ± 1.7 |
| | AM | 74.5 ± 5.7 | 86.2 ± 2.0 | 92.1 ± 1.4 |

At a concentration of 1,000 and after 24 hours of treatment, dyes R80 and B214 have been almost completely removed from the biomass pre-grown in all culture media, with high decolourization percentages already after 2 hours. The dye RBBR has been removed with percentages below 97.9% (Table 8).

As far as wastewaters containing single dyes or the dye mix at 5,000 ppm, good decolorization yields have been achieved; in particular, with the mix percentages of 78.4% to 92.1% have been obtained (Table 9).

As for living biomasses, during absorption with deactivated biomasses no change in spectrum form has been observed for single dyes (R80 and B214). Conversely, a change in the profile of the absorption spectrum has been observed for the wastewater containing the dye mix, in particular at wavelengths of about 540 and 580 nm. Such change can be explained assuming that some dyes may be absorbed by the biomass more or less easily (FIG. 1).

Table 10 contains SC values of deactivated biomasses of *R. pusillus* MUT 2229 (averages±standard deviations of 3 repetitions) pre-grown in EQ, GN1, GN4 and AM towards simulated wastewaters containing dyes R80, B214 and RBBR as well as the mixture of 10 dyes at a concentration of 5,000 ppm. SC values obtained with dyes at 1,000 ppm are not shown therein since decolourization percentage was so high (close to 100%) to prevent a correct calculation of this parameter.

TABLE 10

| | Sorption capacity (mg of dye g$^{-1}$ of biomass) | | | |
|---|---|---|---|---|
| Dye | EQ | GN1 | GN4 | AM |
| R80 | 365.4 ± 20.0$^{Aa}$ | 211.9 ± 14.5$^{Ab}$ | 283.7 ± 28.9$^{Ac}$ | 386.8 ± 59.8$^{Aa}$ |
| B214 | 532.8 ± 14.5$^{Ba}$ | 468.4 ± 19.6$^{Bb}$ | 520.8 ± 51.4$^{Bab}$ | 403.9 ± 37.8$^{Ac}$ |
| RBBR | 167.9 ± 35.8$^{Ca}$ | | | 300.9 ± 21.6$^{Ab}$ |
| Mix | 410.5 ± 35.4$^{Aa}$ | 785.1 ± 53.8$^{Cb}$ | 737.5 ± 59.2$^{Cb}$ | 453.8 ± 12.4$^{Ba}$ |

$^{a,b,c}$refer to significant differences (p ≤ 0.05) among values of sorption capacity obtained with biomasses pre-grown in different culture media for the same simulated wastewater.
$^{A,B,C}$refer to significant differences (p ≤ 0.05) among values of sorption capacity towards different simulated wastewaters in the same culture medium.

A comparison of the 4 different culture media used for producing the biomass (EQ, GN1, GN4 and AM) points out that the sorption capacity of *R. pusillus* MUT 2229, in the presence of the dye R80, is significantly higher when biomasses are pre-grown in EQ and AM, whereas in the presence of the mix, when biomasses are pre-grown in GN1 and GN4.

Effluent Models

Table 11 shows decolourization percentages (average±standard deviations of 3 replicates) of effluent models, after 2, 6 and 24 hours of incubation with the biomass of *Rhizomucor pusillus* MUT 2229 pre-grown in EQ and AM.

TABLE 11

| | Culture | Decolourization percentage (%) | | |
|---|---|---|---|---|
| Effluent | medium | 2 hours | 6 hours | 24 hours |
| R1 | EQ | 87.3 ± 5.9$^A$ | 91.7 ± 2.0$^{AB}$ | 93.4 ± 0.5$^B$ |
| | AM | 89.6 ± 2.3$^A$ | 85.4 ± 4.2$^A$ | 78.4 ± 7.9$^A$ |
| R2 | EQ | 71.3 ± 3.9$^A$ | 69.6 ± 4.6$^A$ | 65.1 ± 4.1$^A$ |
| | AM | 64.9 ± 3.1$^A$ | 64.6 ± 3.3$^A$ | 63.2 ± 4.7$^A$ |
| R3 | EQ | 40.1 ± 0.4$^A$ | 56.7 ± 2.8$^B$ | 87.4 ± 2.3$^C$ |
| | AM | 60.7 ± 3.0$^A$ | 72.8 ± 4.1$^B$ | 89.9 ± 1.7$^C$ |

$^{A,B,C}$refer to significant differences (p ≤ 0.05) among values of decolourization percentage at different incubation time obtained by the same biomass.

Substantial decolourization of R1 was obtained by the biomass pre-grown in EQ (DP value higher than 93% within 24 hours); more than 96% of the total decolourization was achieved within 2 hours. For the biomass pre-grown in AM, the highest DP was recorded after 2 hours and no significative differences were noted during the following 18 hours.

In the case of R2 no significant differences were observed between 2, 6 and 24 hours and the highest DP values (higher than 65%) were reached within 2 hours.

The DP values for R3 were higher than 87% after 24 hours. In comparison to the other simulated effluents, lower percentages (67% and 46%) of the total decolourization obtained at the end of the experiments were attained within 2 hours and significant differences were observed among the DP values at 2, 6 and 24 hours.

Obviously, details and embodiments can be widely varied with respect to what has been here described and shown, although without leaving the protection scope of the present invention as defined in the appended claims.

BIBLIOGRAPHY

1. Abd El-Rahim, W. M., Moawad, H., and Khalafallaah, M. 2003. Enhancing the growth of promising fungal strains for rapid dye removal. Presenius Environmental Bulletin 12: 764-770.
2. Aksu, Z. 2005. Application of biosorption for the removal of organic pollutants: A review. Process Biochemistry 40:997-1026
3. Aksu, Z and Cagatay, S. S. 2006. Investigation of biosorption of Gemazol turquoise Blue-G reactive dye by dried *Rhizopus arrhizus* in batch and continuous systems. Separation and Purification Technology 48: 24-35.
4. Aksu, Z. and Tezer, S. 2000. Equilibrium and kinetic modelling of biosorption of Remazol Black B by *Rhizopus arrhizus* in a batch system: effect of temperature. Process Biochemistry 36:431-439.
5. Banat, I. M., Nigam, P., Singh, D., and Marchant, R. 1996. Microbial decolorization of textile-dye-containing effluents: A review. Bioresource Technology 58:217-227.
6. Bartniki-Garcia, S. and Nickerson, W. J. 1962. Isolation, composition and structure of cell walls of filamentous and yeast-like forms of *Mucor rouxii*. Biochim. Biophys. 58:102-119.
7. Brahimihorn, M. C., Lim, K. K., Liang, S. L. and Mou, D. G. 1992. Binding of Textile Azo Dyes by *Myrothecium verrucaria*. Journal of Industrial Microbiology 10:31-36.
8. Christov, L. P., Van Driessel, B., and du Plessis, C. A. 1999. Fungal biomass from *Rhizomucor pusillus* as adsorbent of chromophores from a bleach plant effluent. Process Biochemistry 35:91-95.
9. Crini, G. 2006. Non-conventional low-cost adsorbents for dye removal. A review. Bioresource Technology 97:1061-1085.
10. El-Mougith, A. A. 1999. Effect of benomyl on growth and lipid composition of *Trichoderma koningii*. Folia Microbiologica 44:41-44.
11. ETAD. 1989. Guidelines for Safe Handling of Dyes. U.S: Operating Committee of ETAD.
12. Farkas, V. 1980. Biosynthesis of cell wall of fungi. Microbiological Research 43:117-141.
13. Fu, Y. Z. and Viraraghavan, T. 2000. Removal of a dye from an aqueous solution by the fungus *Aspergillus niger*. Water Quality Research Journal of Canada 35:95-111.
14. Fu, Y. Z. and Viraraghavan, T. 2001. Fungal decolorization of dye wastewaters: a review. Bioresource Technology 79:251-262.
15. Fu, Y. Z. and Viraraghavan, T. 2002a. Removal of Congo Red from an aqueous solution by fungus *Aspergillus niger*. Advances in Environmental Research 7:239-247.
16. Fu, Y. Z. and Viraraghavan, T. 2002b. Dye biosorption sites in *Aspergillus niger*. Bioresource Technology 82:139-145.
17. Hefnawy M. A., Nasr, M. I., and El-Mongy, M. 1999. Growth and soluble amino acid composition in *Penicillium corylophilum* and *Halobacterium halobium* grown under salt stress. Folia Microbiologica 44:25-31.
18. Knapp, S. J., Vantoch-Wood, E., and Zhang, F. 2001. Use of wood-rotting fungi for the decolorisation of dyes and industrial effluents. In: Gadd, G. M. (Ed.). Fungi in bioremediation. Cambridge University Press, pp. 27-51.
19. Krystofova, S., Ortega-Perez, R., Turian, G., Betina, V., and Varecka, L. 1998. Phosphoinositides and inositol phosphates in grown and photoconidiation of *Trichoderma viride*. Folia Microbiologica 43:89-96.
20. Martins, M. A. M., Lima, N., Silvestre, A. J. D., and Queiroz, M. J. 2003. Comparative studies of fungal degradation of single or mixed bioaccessible reactive azo dyes. Chemosphere 52:967-973.
21. McMullan, G., Meehan, C., Conneely, A., Kirby, N., Robinson, T., Nigam, P., Banat, I. M., Marchant, R., and Smyth, W. E. 2001. Microbial decolourisation and degradation of textile dyes. Applied Microbiology and Biotechnology 56:81-87.
22. Nemcovic, M. and Farkas V. 2001. Cell-wall composition and polysaccharide synthase activity changes following photoinduction in *Trichoderma viride*. Acta Biologica Hungarica 52:281-288.
23. O'Mahony, T., Guibal, E., and Tobin, J. M. 2002. Reactive dye biosorption by *Rhizopus arrhizus* biomass. Enzyme and Microbial Technology 31:456-463.
24. O'Neill, C., Hawkes, F. R., Hawkes, D. L., Lourenco, N. D., Pinheiro, H. M., and Delee, W. 1999. Colour in textile effluents—sources, measurement, discharge consents and simulation: a review. Journal of Chemical Technology and Biotechnology 74:1009-1018.
25. Pearce, C. I., Lloyd, J. R., Guthrie, J. T. 2003. The removal of colour from textile wastewater using whole bacterial cells: a review. Dyes and Pigments 58:179-196.
26. Pessoni, R. A. B., Freshour, G., Figueiredo-Ribeiro, R. D. L., Hahn M. G., and Braga, M. R. 2005. Cell-wall structure and composition of *Penicillium janczewskii* as affected by inulin. Mycologia 97:304-311.
27. Polman, J. K. and Breckenridge, C. R. 1996. Biomass-mediated binding and recovery of textile dyes from waste effluents. Textile Chemist and Colorist 28:31-35.
28. Robinson, T., McMullan, G., Marchant, R., and Nigam, P. 2001. Remediation of dyes in textile effluent: a critical review on current treatment technologies with a proposed alternative. Bioresource Technology 77:247-255.
29. Soares, G. M. B., Costa-Ferreira M., and de Amorim M. T. P. 2001. Decolorization of an anthraquinone-type dye using a laccase formulation. Bioresource Technology 79:171-177.
30. Van Driessel, B. and Christov, L. 2002. Short communication—Adsorption of colour from a bleach plant effluent using biomass and cell wall fractions from *Rhizomucor pusillus*. Journal of Chemical Technology and Biotechnology 77:155-158.
31. Yesilada, O., Asma, D., and Cing, S. 2003. Decolorization of textile dyes by fungal pellets. Process Biochemistry 38:933-938.
32. Weisburger, J. H. 2002. Comments on the history and importance of aromatic and heterocyclic amines in public health. Mutation research-Fundamental and molecular mechanisms of mutagenesis 506:9-20.
33. Zhang, S. J., Yang, M., Yang, Q. X., Zhang, Y., Xin, B. P., and Pan, F. 2003. Biosorption of reactive dyes by the mycelium pellets of a new isolate of *Penicillium oxalicum*. Biotechnology Letters 25:1479-1482.
34. Znidarsic, P., Marosek, N., and Pavko, A. 1999. Chitin contents in different morphological forms of *Rhizopus nigricans*. Folia Microbiologica 44:557-560.

The invention claimed is:

1. Use of a fungal biomass for treating industrial wastewaters containing at least one dye, wherein:
   i. the fungal biomass comprises at least the fungal strain *Rhizomucor pusillus* (Lindt) Schipper MUT 2229, DSMZ NO. 18656;
   ii. the fungal biomass is contacted with the industrial wastewaters and absorbs the at least one dye, so as to obtain wastewater that is basically free of the at least one dye.

2. The use according to claim 1, wherein the at least one dye belongs to the class of azo or anthraquinone dyes, phthalocyanine dyes.

3. The use according to claim 1, wherein the at least one dye contains a chromophore group chosen from the group comprising azo groups, anthraquinone groups, phthalocyanine groups, indigo groups and stilbene groups.

4. The use according to claim 1, wherein the fungal biomass is living.

5. The use according to claim 1, wherein the fungal biomass is deactivated.

6. The use according to claim 1, wherein the fungal biomass is grown in a culture medium containing a carbon source.

7. The use according to claim 6, wherein the culture medium containing a carbon source is selected among starch, glucose, sucrose or mixtures thereof.

8. The use according to claim 6, wherein the fungal biomass is grown in a culture medium further containing an ammonium salt.

9. A method for treating industrial wastewaters containing at least one dye, comprising the following steps:
   a. preparing a fungal biomass comprising at least the fungal strain *Rhizomucor pusillus* (Lindt) Schipper MUT 2229, DSMZ 18656;
   b. contacting the fungal biomass with the industrial wastewater for a sufficient lapse of time so as to enable the absorption of the at least one dye by the fungal biomass, thus obtaining wastewater that is basically free of the at least one dye.

10. The method according to claim 9, wherein the fungal biomass is grown in a culture medium containing a carbon source.

11. The method according to claim 10, wherein the culture medium containing a carbon source is selected among starch, glucose, sucrose or mixtures thereof.

12. The method according to claim 10, wherein the fungal biomass is grown in a culture medium further comprising an ammonium salt.

13. The method according to claim 10, wherein the fungal biomass is grown in a culture medium further comprising at least a salt of K, Mg, Ca, Na, Mn, Fe, Co, Zn, Cu, Al, B and Mo.

14. The method according to claim 10, wherein the fungal biomass is separated from the culture medium before the fungal biomass is contacted with the industrial wastewater to be treated.

15. The method according to claim 9, wherein the fungal biomass is deactivated by means of chemical or physical treatment, before the fungal biomass is contacted with the industrial wastewater to be treated.

16. The method according to claim 15, wherein the deactivation of the fungal biomass occurs by means of sterilization.

17. The use according to claim 8 wherein said ammonium salt is ammonium tartrate.

18. The method according to claim 12 wherein said ammonium salt is ammonium tartrate.

* * * * *